United States Patent [19]
Ching

[11] Patent Number: 5,415,956
[45] Date of Patent: May 16, 1995

[54] COVER ASSEMBLY FOR RECHARGEABLE BATTERY

[75] Inventor: Larry K. W. Ching, Littleton, Colo.

[73] Assignee: Optima Batteries, Inc., Denver, Colo.

[21] Appl. No.: 187,747

[22] Filed: Jan. 26, 1994

Related U.S. Application Data

[62] Division of Ser. No. 693,988, Apr. 29, 1991, Pat. No. 5,283,137.

[51] Int. Cl.⁶ .............................................. H07M 2/10
[52] U.S. Cl. .................................. 429/187; 16/114 R
[58] Field of Search ....... 429/187; 16/114 R, DIG. 15

[56] References Cited

U.S. PATENT DOCUMENTS

| | | | |
|---|---|---|---|
| 1,540,155 | 6/1925 | Wydom et al. | |
| 2,116,928 | 5/1938 | Hanneman . | |
| 2,737,542 | 3/1956 | Shannon et al. | 429/175 |
| 2,886,622 | 5/1959 | Shannon | 429/175 |
| 3,457,119 | 7/1969 | Tench | 429/187 |
| 3,937,636 | 2/1976 | Slautterback | 429/179 |
| 3,961,988 | 6/1976 | Andreoff | 429/175 |
| 4,346,151 | 8/1982 | Uba et al. | 429/54 |
| 4,383,011 | 5/1983 | McClelland et al. | 429/54 |
| 4,592,972 | 6/1986 | Juergens et al. | 429/160 |
| 4,632,888 | 12/1986 | Kump et al. | 429/187 |
| 4,673,625 | 6/1987 | McCartney et al. | 429/187 |
| 4,770,957 | 9/1988 | Miyagawa | 429/175 |
| 4,780,379 | 10/1988 | Puester | 429/59 |
| 4,857,422 | 8/1989 | Stocchiero | 429/175 |
| 5,111,952 | 5/1992 | Stocchiero | 220/94 R |
| 5,242,769 | 9/1993 | Cole et al. | 429/187 |

FOREIGN PATENT DOCUMENTS

| | | | |
|---|---|---|---|
| 2042249 | 9/1980 | United Kingdom | 429/175 |
| 2087637 | 5/1982 | United Kingdom | 429/175 |

Primary Examiner—Stephen Kalafut
Attorney, Agent, or Firm—Donald W. Margolis; John L. Isaac

[57] ABSTRACT

A device is disclosed both for covering a multi-cell rechargeable battery having upper terminal connections and for use as a mounting spacer for the battery. The device includes a cover sized and shaped to shield the top surface of the battery when attached thereto and has a plate with apertures disposed therein to provide limited access to the upper terminal connections. A mechanism is provided for spacing the lid from the top surface of the battery to recess the upper terminal connections relative to the upper surface of the plate for protection against surface contact and electrical shorting, the spacing mechanism being integral with the plate. An attachment device is also provided for selectively attaching the cover to the battery to protect the battery top surface and upper terminal connections from damage from objects placed on the plate. The attachment device is further adapted for selectively securing the cover to the bottom surface of the battery to function as a spacer for battery mounting. Finally, a mechanism is provided for testing of the electrical condition of the battery without removing the cover.

12 Claims, 9 Drawing Sheets

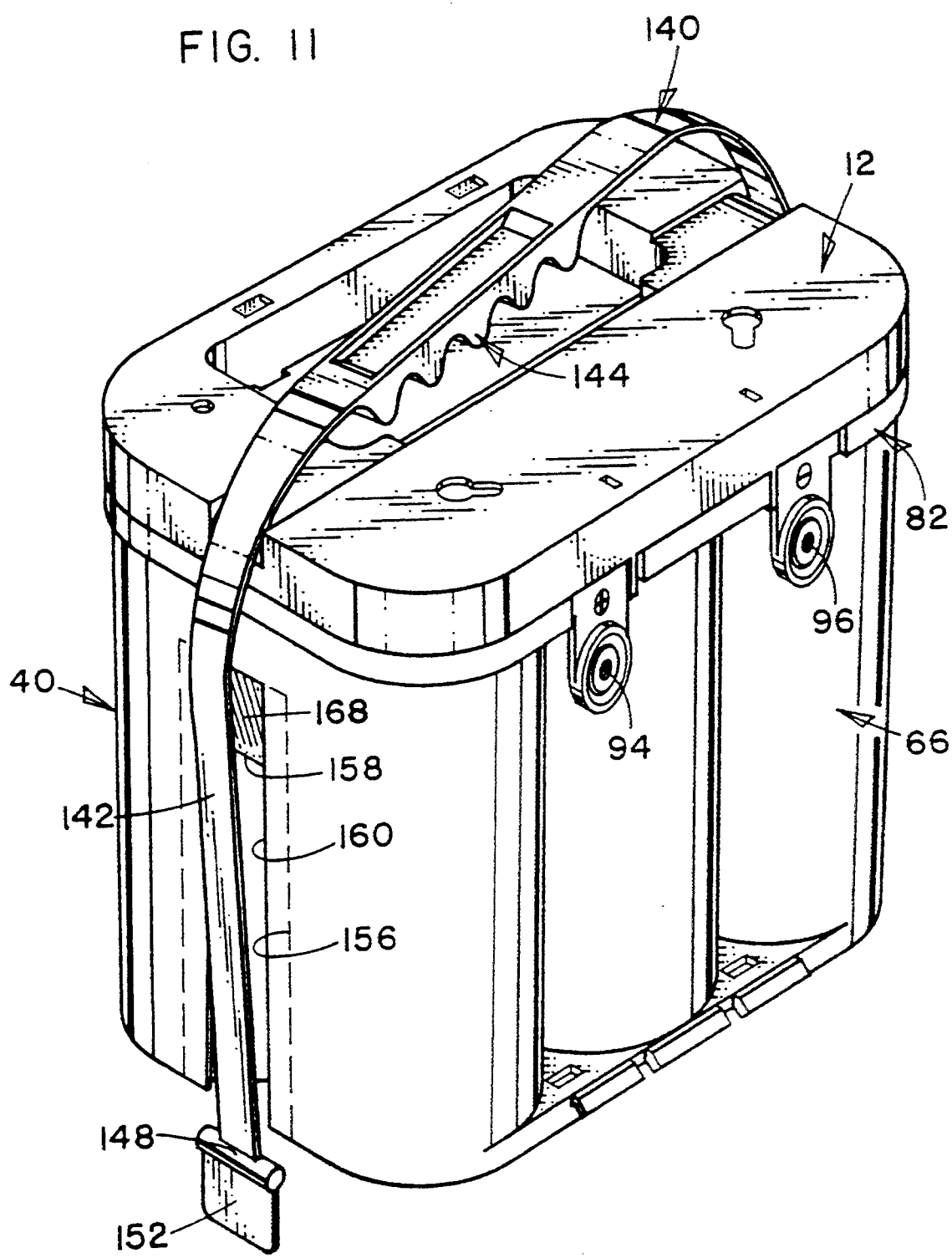

COVER ASSEMBLY FOR RECHARGEABLE BATTERY

This is a divisional application of application Ser. No. 07/693,988, filed Apr. 29, 1991, now U.S. Pat. No. 5,283,137. Priority of the prior application is claimed pursuant to 35 USC § 120.

BACKGROUND OF THE INVENTION

1. Field of the Invention

This invention relates to multi-cell rechargeable batteries and, more particularly, to sealed batteries employing a mono-block container for housing a plurality of cells. Specifically, the present invention relates to a multi-purpose, integral spacer and cover for multi-cell rechargeable batteries.

2. Description of the Prior Art

A variety of configurations are well known for multi-cell rechargeable battery housings. Such housings have taken a number of different shapes and have included housing structures for cylindrically shaped cells. Typically, the cells are fitted into mono-block containers having an outer parallelepiped shape, such as illustrated in U.S. Pat. Nos. 2,543,106, 2,836,642, 4,346,151 and 4,592,972. In such mono-block housings adapted for cylindrical cells, the housing top or lid is generally positioned after the cells and electrolyte are introduced into the housing. The lid is then sealed, and the underside of the lid has appropriate inter-connecting members for the various cells contained within the housing. These interconnecting members are introduced to the outside through two top terminal posts which protrude through the lid. The above mentioned U.S. Patents as well as U.S. Pat. No. 4,383,011 illustrate a variety of lid structures available for such battery housings.

Certain battery applications require that the battery terminals preferably be positioned along the side portion of the battery. In order to avoid the necessity of having to utilize special adapters to use a top terminal battery in such side terminal applications, certain battery designs have become available which include a pair of top terminal posts as well as a pair of side terminal posts, thereby enabling the battery to be readily utilized in either type of connection application. This is particularly true in automobile battery applications. Unfortunately, existing battery designs do not include any type of device to protect the top terminal posts from damage during transportation or inadvertent shorting when the side terminal posts are being utilized. Moreover, it is not infrequent to require the elevation of batteries when placed within certain automobile applications. Such applications constantly require on-the-spot adjustments with whatever materials are available to raise or elevate the battery relative to the housing holder within the automobile. Thus, there is a need for battery housing structures which include some sort of terminal protection as well as some sort of spacing device as optional features.

SUMMARY OF THE INVENTION

A device is disclosed for covering a multi-cell rechargeable battery having top and bottom surfaces and upper terminal connections projecting from the top surface, and for use as a mounting spacer for the battery. The device includes a cover sized and shaped to shield the top surface of the battery when attached thereto including a plate having upper and lower surfaces with apertures disposed therein to provide limited access to the upper terminal connections. A mechanism is provided for spacing the plate from the battery top surface to recess the upper terminal connections relative to the surface of the plate for protection against surface contact and electrical shorting, the spacing mechanism being integral with the plate. Apparatus is further provided for selectively attaching the cover to the battery to protect the battery top surface and upper terminal connections from damage from objects placed on the plate. The attachment apparatus is further adapted for selectively securing the cover to the bottom surface of the battery to function as a spacer for battery mounting. Finally, a mechanism is provided for permitting testing of the electrical condition of the battery without removing the cover.

BRIEF DESCRIPTION OF THE DRAWINGS

The accompanying drawings which are incorporated in and form a part of the specification illustrate preferred embodiments of the present invention and together with the description, serve to explain the principles of the invention. In the drawings:

FIG. 11 is a front perspective view of the battery illustrated in FIG. 10 but showing the handle assembly in a partially disengaged position for removal or attachment of the handle assembly to the battery.

DETAILED DESCRIPTION OF THE PREFERRED EMBODIMENTS

Figure 1:
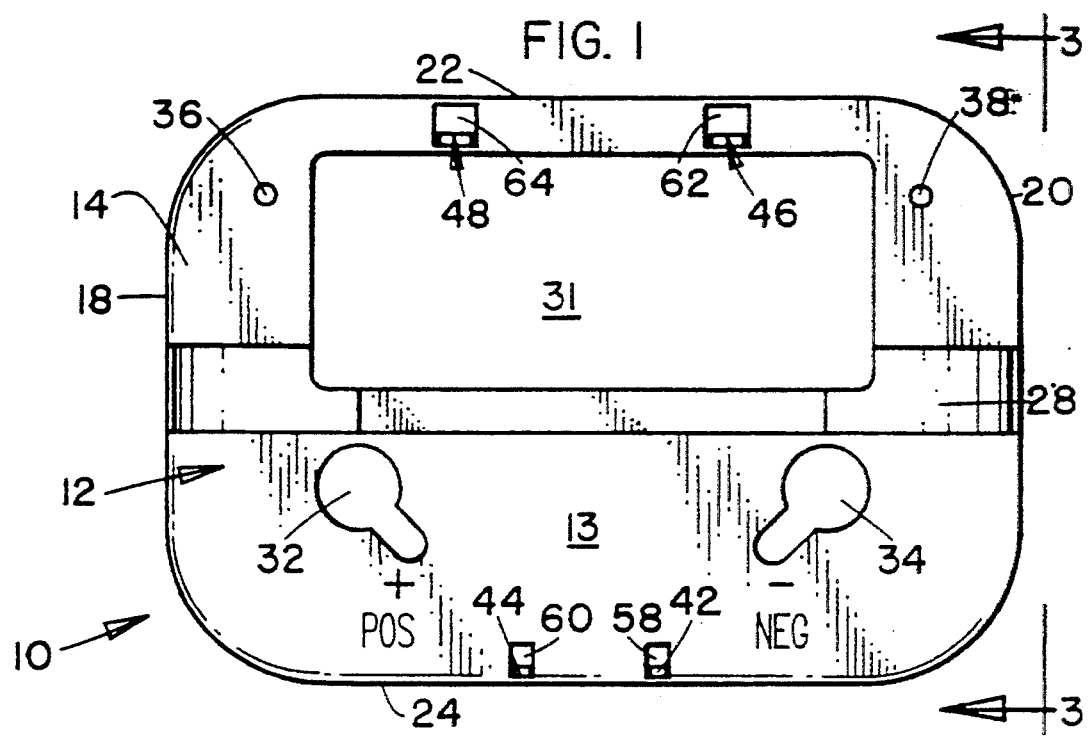
FIG. 1 is a top plan view of a battery cover member constructed in accordance with the present invention.
Figure 2:
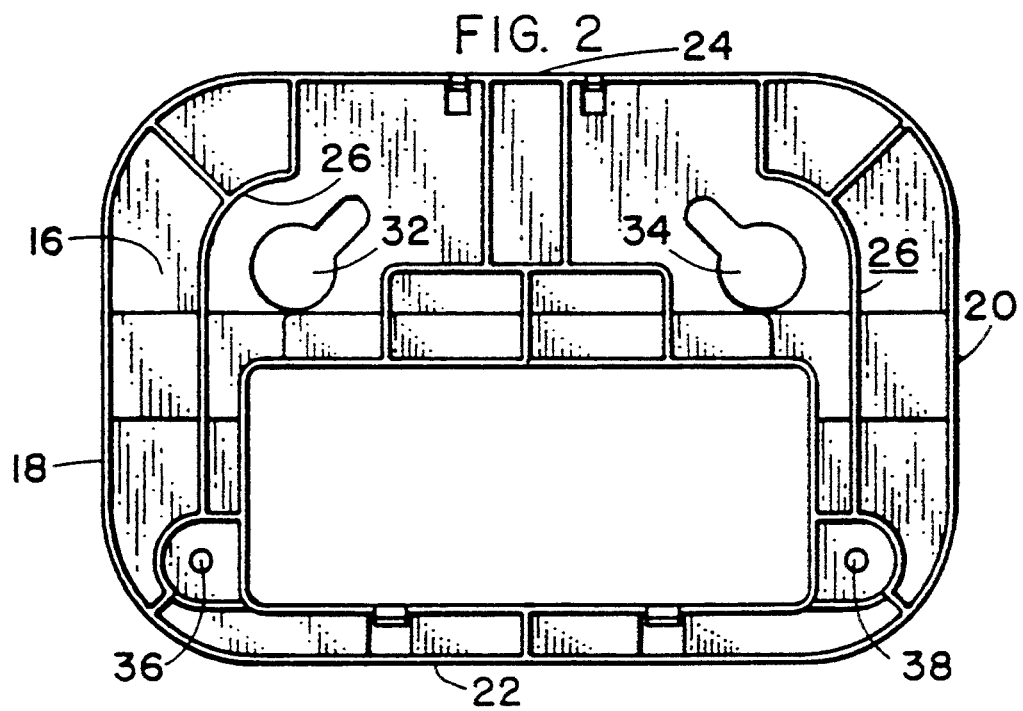
FIG. 2 is a bottom plan view of the cover member of FIG. 1.
Figure 3:
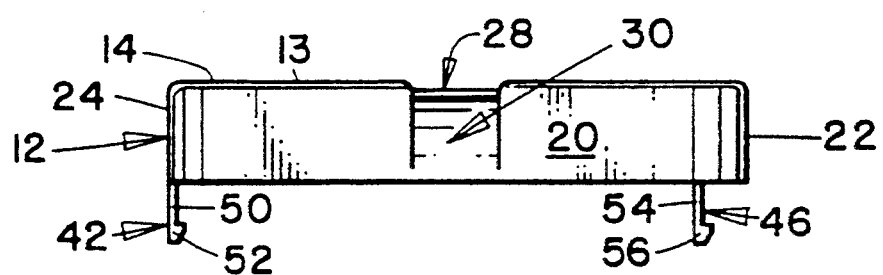
FIG. 3 is a side plan view taken substantially along line 3—3 of FIG. 1.
Figure 4:
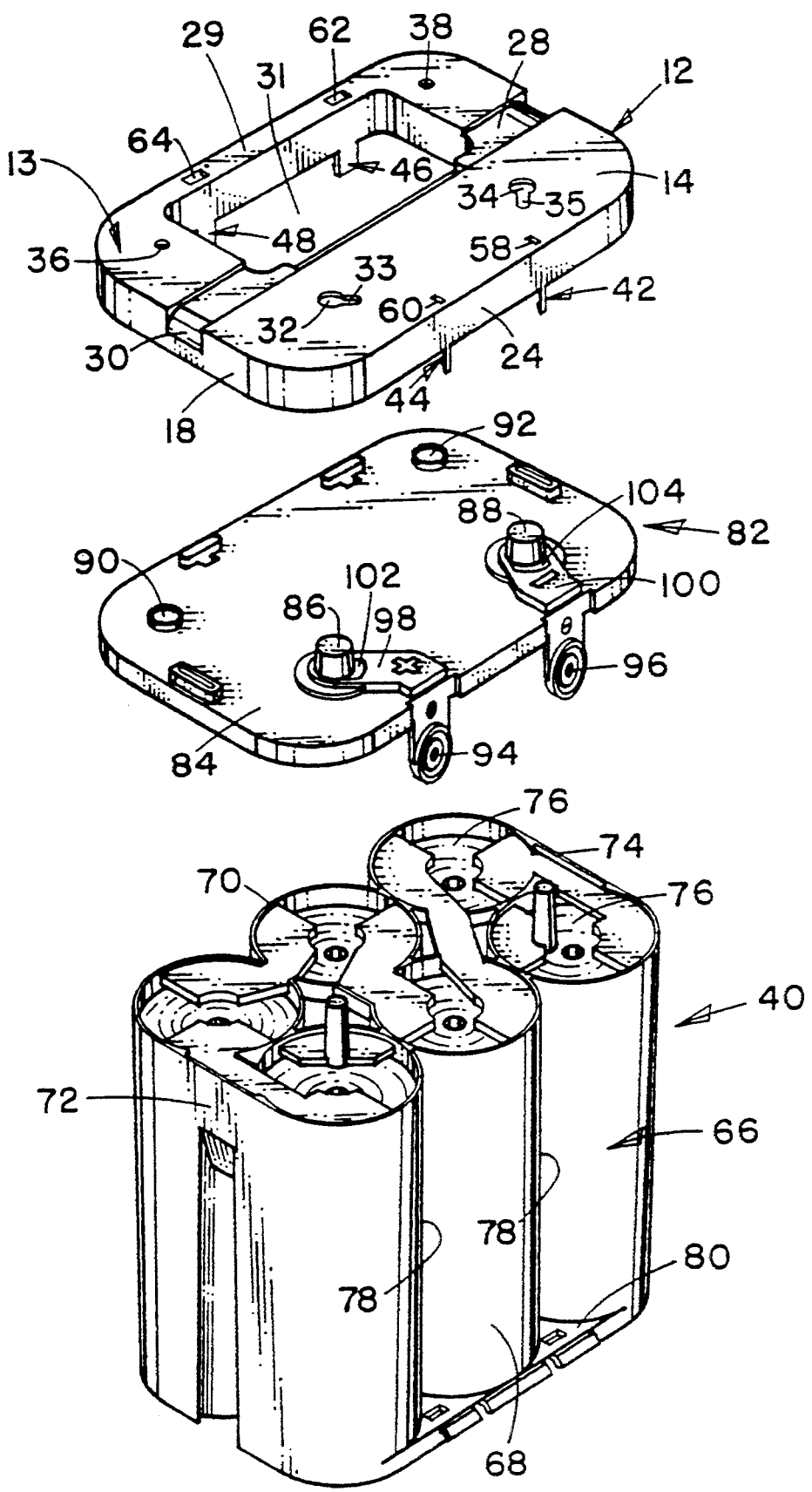
FIG. 4 is a front perspective view, with some parts exploded, of a battery including the cover assembly constructed in accordance with the present invention.

Rechargeable batteries are generally stacked during shipment and are therefore subject to battery terminal damage unless some sort of protector or spacer device is utilized between stacked batteries. Moreover, rechargeable, sealed batteries are being designed having both top terminal connections as well as side terminal connections to meet multiple use requirements. Such design arrangements, however, can lead to an electrical shorting problem during use of the battery when one set of terminals is being used and the other is not, unless the unused terminals are somehow protected. The present invention is a multi-purpose, integral spacer and cover for such a battery, which cover/spacer acts as a spacer member in certain battery mounting applications as well as a protector for the battery top terminals during shipment and in certain battery applications.

Referring now to FIGS. 1–4, a preferred unitary body 10 is preferably in the form of a cover member 12 having a top plate 13 with an upper planer surface 14, a bottom planer surface 16, oppositely disposed end portions 18, 20, and oppositely disposed side portions 22, 24. A plurality of structural support members 26 are preferably in the form of a web of interconnected ribs projecting downwardly from the bottom surface 16 of the plate 13 and are interconnected with each other as well as connected to the end members 18, 20 and the side members 22, 24. The web of structural support members 26 provide support and strength to the cover member 12 when in position on top of or beneath a battery housing as discussed in greater detail below.

The cover member 12 and components thereof may be constructed from any desired material, preferably nonconductive, and more preferably a plastic polyvinyl chloride-type of material. Moreover, the cover member 12 and components thereof are preferably comprised of a unitary, single molded article of manufacture for reduced cost and increased strength, although cover member 12 may alternatively be constructed from various component parts joined together into one structure.

The cover member 12 preferably includes an elongated recessed area 28 disposed along the top surface 14 of the plate 13. The recessed area 28 is preferably positioned along the entire length of the plate 13 substantially along the center line thereof and also defines end recess portions 30 along the end surfaces 18, 20 of the cover 12. This arrangement is more clearly illustrated in FIGS. 4–6. An enlarged opening 31 is also preferably provided in the plate 13 adjacent a section of the recessed portion 28 to define part of the below mentioned nesting area as well as to permit viewing of the battery lid and to form a reinforced side member 29. The recessed portion 28 and opening 31 are provided for the nesting of a handle during stacking of the battery housings as described in greater detail below.

The plate 13 also includes a pair of apertures 32, 34 which are positioned for alignment with the top terminal portions of the battery housing assembly to be described below. Slots or channels 33, 35 are also provided in the plate 13 extending outwardly from the circumferential edge of the apertures 30, 32, respectively. The apertures 32, 34 and channels 33, 35 are sized so as to provide limited access, if desired, to the terminals. For easy identification, lettering indicating positive and negative are provided on the top surface 14 proximate each of the apertures 32, 34. Small apertures 36, 38 are also optionally provided as air vents to the venting devices which may be present in the lid structure of the battery housing.

Figure 6:
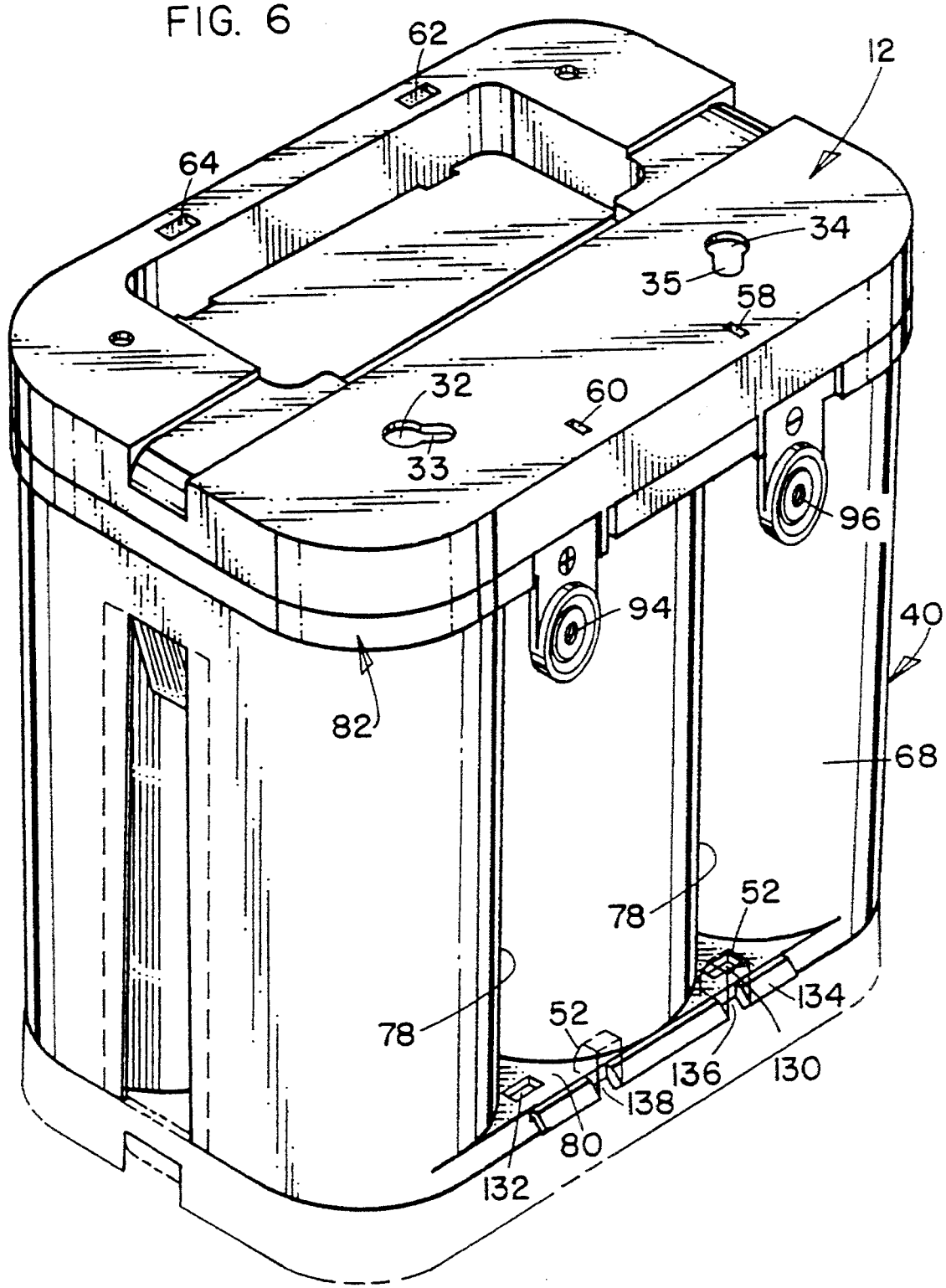
FIG. 6 is a front perspective view of the battery illustrated in FIG. 4 with all components assembled and the cover member positioned over the top surface of the battery.
Figure 7:
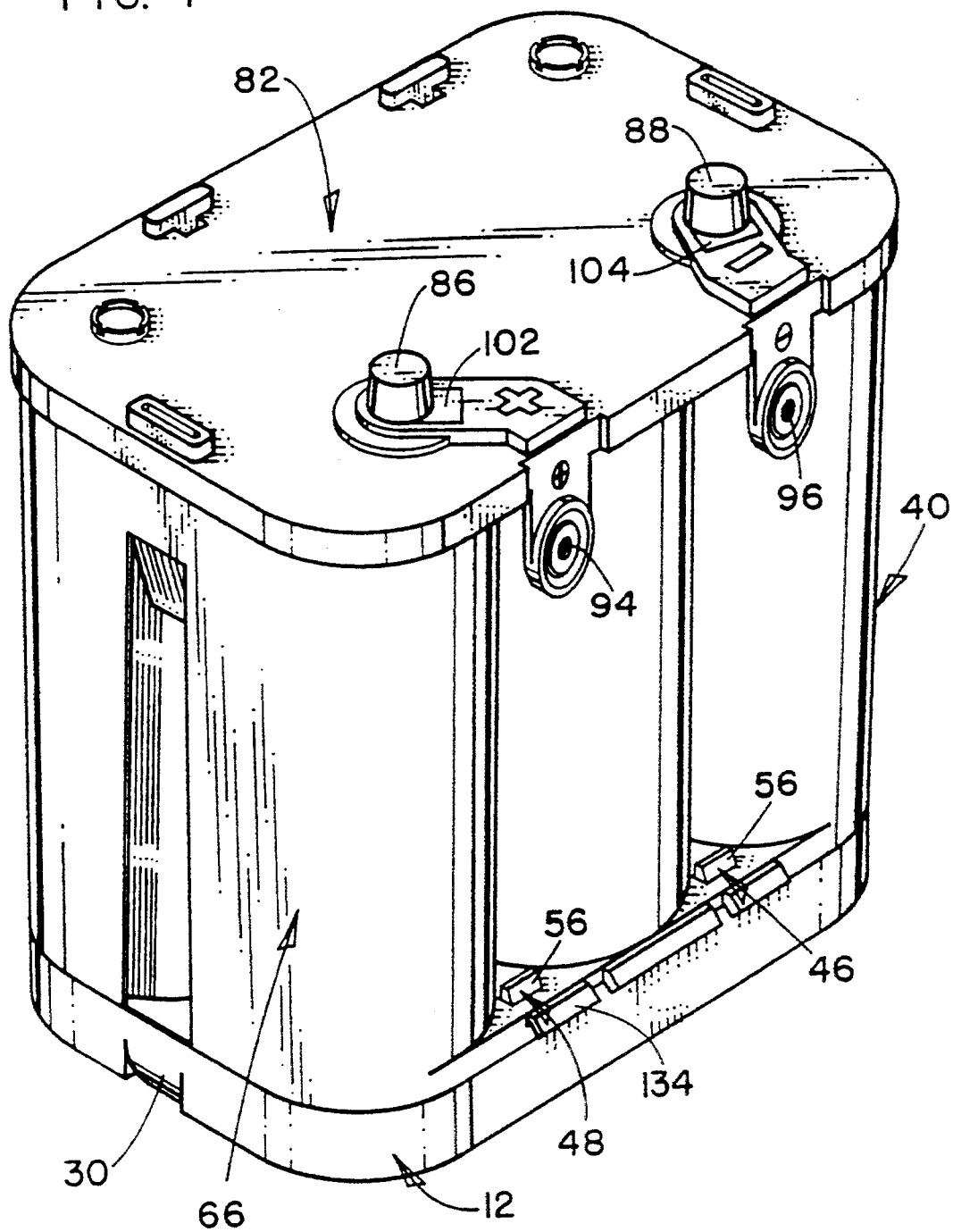
FIG. 7 is a front perspective view of the battery similar to that illustrated in FIG. 6 but illustrating the cover member positioned as a spacer at the bottom surface of the battery.

The attachment of the cover 12 to the top of a battery assembly housing 40 is preferably provided by two sets of releasable attachment mechanisms 42, 44 and 46, 48. The attachment mechanisms 42, 44 and 46, 48 are arranged to secure the cover to the battery housing 40 whether the cover 12 is in its top cover position as shown in FIG. 6 or its bottom spacer position as shown in FIG. 7. While any appropriate and desired releasable attachment mechanism may be utilized, each of the attachment mechanisms 42, 44 and 46, 48 are preferably in the form of a pair of hook or catch members 42, 44 and 46, 48. Each of the hook members 42, 44 includes a resilient arm member 50 extending from the cover 12 and an end clip or catch 52 cantilevered at the end of the arm member 50. Likewise, each of the attachment members 46, 48 includes a resilient arm member 54 extending downwardly from the cover 12 and an end clip or catch 56 cantilevered from the free end of the arm 54. Each of the attachment members 42, 44 are spaced from each other along the side 24 of the cover 12, and each of the attachment members 46, 48 are likewise spaced from each other along the side 22 of the cover 12 so as to provide for a plurality of releasable attachment points between the cover 12 and the housing 40.

The plate 13 of the cover 12 includes a plurality of paired openings 58, 60, 62, 64 in the surface 14 thereof immediately above and in vertical alignment with the attachment members 42, 44 and 46, 48. The openings 58–64 permit access to the catches 52, 56 of the paired attachment members 42, 44 and 46, 48 in order to release them from their latched position as described below.

Referring more particularly, now, to FIGS. 4–8, a typical battery housing 40 is preferably in the form of a mono-block container 66 having sidewall portions 68, 70 and end wall portions 72, 74. In a preferred form, the housing in 66 is sized and shaped to receive a plurality of cylindrical cells 76 which merge together at the sidewall portions 68, 70 and end wall portion 72, 74 along vertically aligned, tangential contact points between respective cells to perform a plurality of nip areas 78 along the exterior side walls 68, 70 and end walls 72, 74 of the battery casing 66. A bottom plate or portion 80 is provided to the casing 66, and a housing lid 82 is also provided for forming the top of the housing 66.

The lid 82 is preferably in the form of a single, molded member 84 having top terminal connection posts 86, 88 projecting upwardly therefrom. In addition, vent members 90, 92 are provided for assisting in venting the housing 66. Side terminal posts 94, 96 are provided and preferably project vertically downwardly from the edge of the singular member 84 so as to nest in the nip areas 78 in the sidewall 68 of the housing 66 when the lid 82 is positioned on the housing 66. The positive side terminal 94 is connected to the positive top terminal post 86 by way of a metal connection member (not illustrated) which is embedded within a protective lid cover portion 98 which is preferably integrally molded into the member 84. Likewise, the negative side terminal connection post 96 is connected to the negative top terminal post 88 by way of a conductive member (not illustrated) which is embedded within a protective lid connection member 100 integrally molded into the member 84. In this manner, shorting of the battery assembly 40 is prevented due to the non-conductive covering of the innerconnection members between the side terminal posts 94, 96 and the top terminal posts 86, 88.

In addition, an exposed or open area in the form of an electrical contact 102 is provided along the base of the positive top terminal post 86, and a similar exposed or open area in the form of an electrical contact 104 is provided along the base of the top negative terminal post 88 in order to permit selective electrical testing of the battery assembly 40 without removal of the cover 12 by access through the aperture extensions 33, 35 of the apertures 32, 34 in the cover 12. In order to achieve such testing, a probe (not illustrated) of standard design may be inserted through the extensions 33, 35 and brought into contact with the electrical contact areas 102, 104, yet access to the terminal posts 86, 88 and the contacts 102, 104 is limited by the cover 12 to prevent inadvertent contact and electrical shorting.

Figure 5:
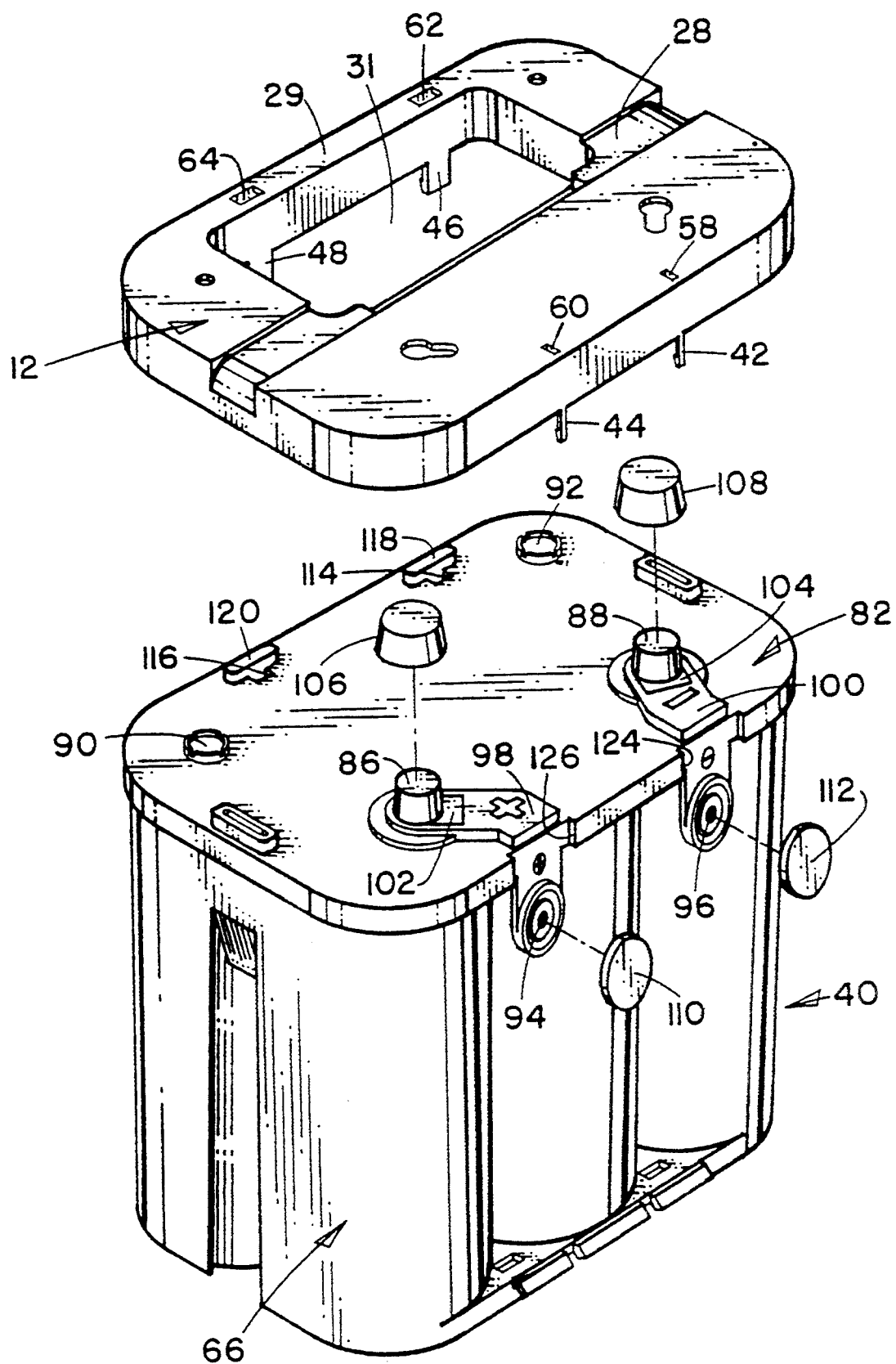
FIG. 5 is a front perspective view, with one part exploded, of the battery illustrated in FIG. 4 having the lid portion attached to the battery housing.

Referring particularly to FIG. 5, the positioning and placement of the lid 82 onto the battery housing assembly 40 is illustrated more clearly. In a preferred form, top terminal post caps 106 and 108 may be placed over the terminal posts 86, 88 prior to attachment of the cover 12 for storage or transportation purposes and whenever the side terminal posts 94, 96 are utilized. The caps 106, 108 are sized and shaped to permit access to the electrical contacts 102, 104 when in position over the posts 86, 88. Likewise, side terminal post caps 110, 112 are removably securable to the side terminal posts 94, 96 in order to prevent inadverting shorting of the battery housing 40 during use of top terminal posts 86, 88 as well as to prevent damage during transportation of the housing 40.

Figure 8:
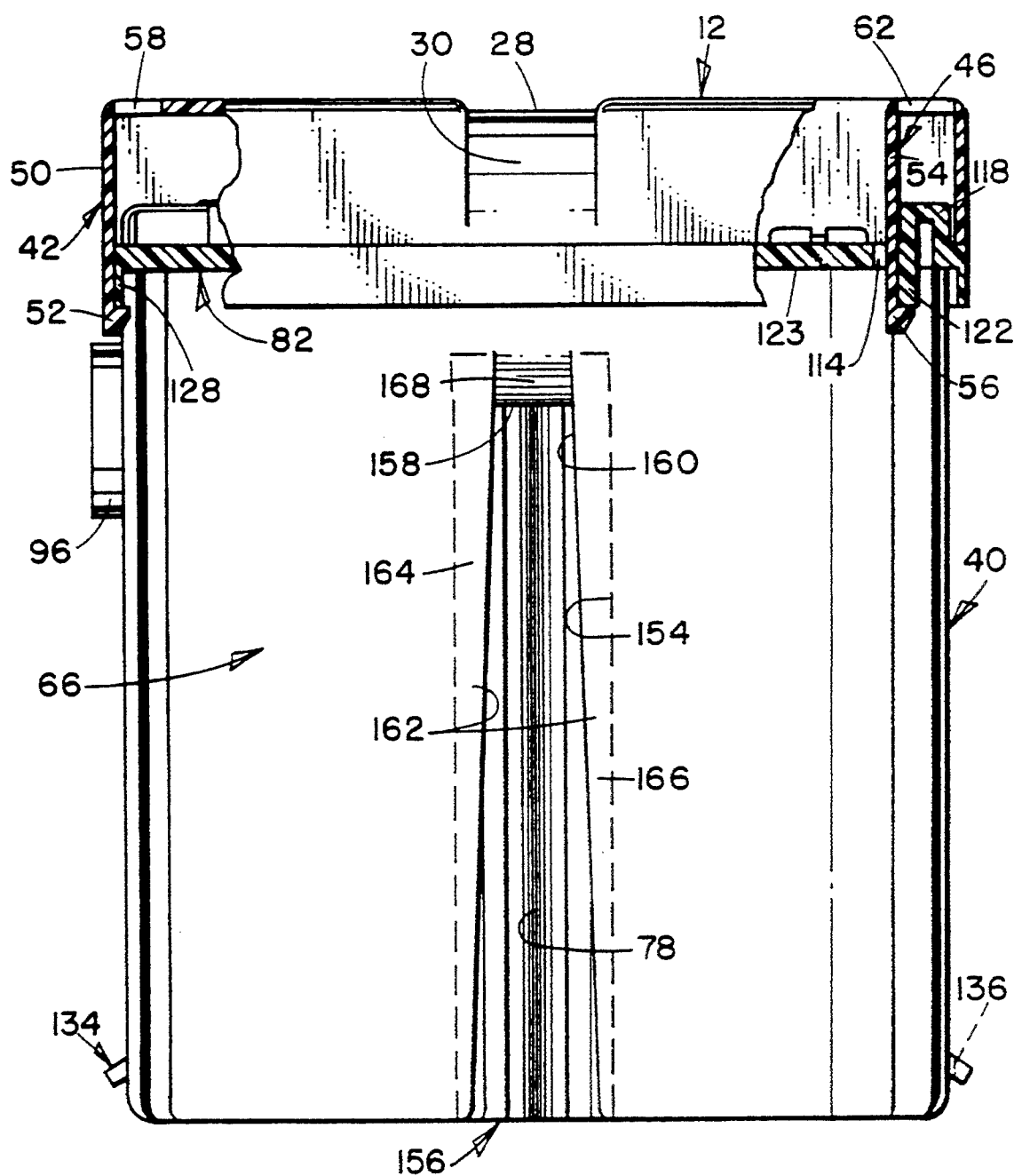
FIG. 8 is a side plan view, with some parts in section, of the battery illustrated in FIG. 6.

Referring to FIGS. 5, 6 and 8, the lid 82 includes a pair of spaced openings 114, 116 which are sized and shaped to receive the attachment members 46, 48 when the cover 12 is placed in its cover position on top of the lid 82. The positioning of the attachment members 46, 48 relative to the apertures 114, 116 can be more clearly seen at FIG. 8. In addition, connector members 118 and 120 are molded into position relative to the apertures 114, 116 to receive the attachment members 46, 48. By way of example, and looking particularly at FIG. 8, the connector member 118 includes a lower extending ledge or lip portion 122 which depends downwardly past the bottom surface 123 of the lid 82 adjacent the opening 114 so as to provide a ledge or a lip to which the catch 56 of the attachment member 46 may engage. As can be further seen from FIG. 8, the purpose of the aperture 62 in the cover 12 is to permit the insertion of a tool or some other object to be able to force the arm 54 of the attachment member 46 away from the ledge 122 to disengage the catch 56 for the removal of the cover 12 from the housing 40. It should be understood that the attachment member 48 functions in like manner with the connector member 120.

The lid 82 further includes a pair of notched shoulders 124, 126 positioned adjacent the depending portions of the members 98, 100 on the edge of the lid 82 opposite from the apertures 114, 116. The notched shoulders 124, 126 are created for alignment with the attachment members 42, 44, with the arm portions 50 of the attachment members 42, 44 abutting the shoulders 124, 126. Each of the shoulders 124, 126 creates a ledge 128 at the bottom portion thereof, as illustrated in FIG. 8. The ledge 128 is adapted to engage the catch 52 of the attachment members 42, 44 so as to engage the attachment members 42, 44 with the lid 82. The apertures 58, 60 are designed to permit a tool or other elongated object for insertion therein to press against the arm member 50 in order to disengage the catch 52 from the ledge 128. In this manner, the cover 12 may be securely fastened to the lid 82 and readily removed therefrom as clearly illustrated in FIGS. 5 and 6.

The cover member 12, when installed on top of the battery assembly 40, provides protection for the upright top terminal posts 86 and 88 during shipping and storage. Batteries may be stacked one on top of each other without damaging the terminals 86, 88 or without applying undue stress to the terminals 86, 88 of the battery beneath it, since the posts 86, 88 even with their caps 106, 108 are recessed relative to the top surface 14 of the cover 12. The aperture extension slots 33, 35 are provided in the areas above the exposed electrical contacts 102, 104 such that the electrical condition of the battery 40 may be tested at any time while the cover 12 and caps 106, 108 are in place. The cover 12 and caps 106, 108 may be left in place on top of the battery assembly 40 to protect the upright terminals 86, 88 in applications that utilize the side terminal posts 94, 96 in order to prevent shorting of the battery by unnecessary exposure of additional, yet unused terminals. Moreover, the positioning and attachment of the cover 12 on top of the battery assembly 40 does not depend on the upright top terminal post 86, 88 as in some prior battery arrangements, but rather depends entirely upon the arrangement of the attachment members 42, 44 and 46, 48 relative to the battery lid 82. In this manner, damage is also prevented to the upright terminals 86, 88. Unlike some existing battery spacers or covers, if a stack of batteries positioned one on top of each other with the cover 12 in place should shift during transit, no stress would be applied to the upright terminal posts 86, 88.

Referring now to FIGS. 6, 7, and 8, the cover member 12 may also be utilized as a mounting spacer. The bottom plate or member 80 of the battery assembly 40 includes a pair of apertures 130, 132 positioned proximate the nip areas 78. The apertures 130, 132 may be on just one side 68 of the battery assembly 40 or they may be positioned on both sides 68, 70 thereof. In addition, a flange 134 is provided along the edge of the bottom portion 80 on either one side 68 or both sides 68, 70, depending upon preference. The flange 134 includes a pair of slots 136, 138 therein, and again such slots may occur on the flange 134 of one or both sides of the battery housing 40. The apertures 130, 132 are spaced and sized so as to receive the catch 56 of the attachment members 46, 48 when the cover 12 is positioned beneath the battery housing 40 in an inverted position as illustrated in FIG. 7. Moreover, the slots 136, 138 are spaced apart so that the catches 52 of the attachment members 42, 44 will engage the flange 134 with the arms 50 of the attachment members 42, 44 passing through the slots 136, 138. The arrangement of the apertures 130, 132 and the slots 136, 138 may be such that only one set of apertures 130, 132 is disposed on one side 68 of the battery 40 while only one pair of the slots 136, 138 are disposed on the opposite side 70 of the battery housing 40 so as to enable or permit the positioning of the cover member 12 in only one arrangement relative to the housing 40. In an alternative embodiment, two pairs of apertures 130, 132 and two pairs of slots 136, 138 may be positioned, one of each pair on each side 68 and 70 of the housing 40, so as to permit the cover 12 to be placed beneath the battery housing 40 in one of two different orientations.

The cover assembly 12 may be removed from its spacer position beneath the housing 40 by simply pressing the catches 52, 56 of both of the attachment members 42, 44 and 46, 48, the catches 52 and 56 being fully exposed for such removal. The cover member 12 in its mounting spacer position beneath the battery 40 is utilized in applications where the battery assembly 40 is shorter in height than the old battery it is replacing. The cover 12 as a spacer is removable and may be discarded from those applications that do not require the additional overall battery height and do not require side terminal connections, so that the cover 12 is required neither as a spacer beneath the battery assembly 40 or as a permanent cover 12 on top of the battery assembly 40, since the top terminal posts in such applications would need to be accessed.

Figure 9:
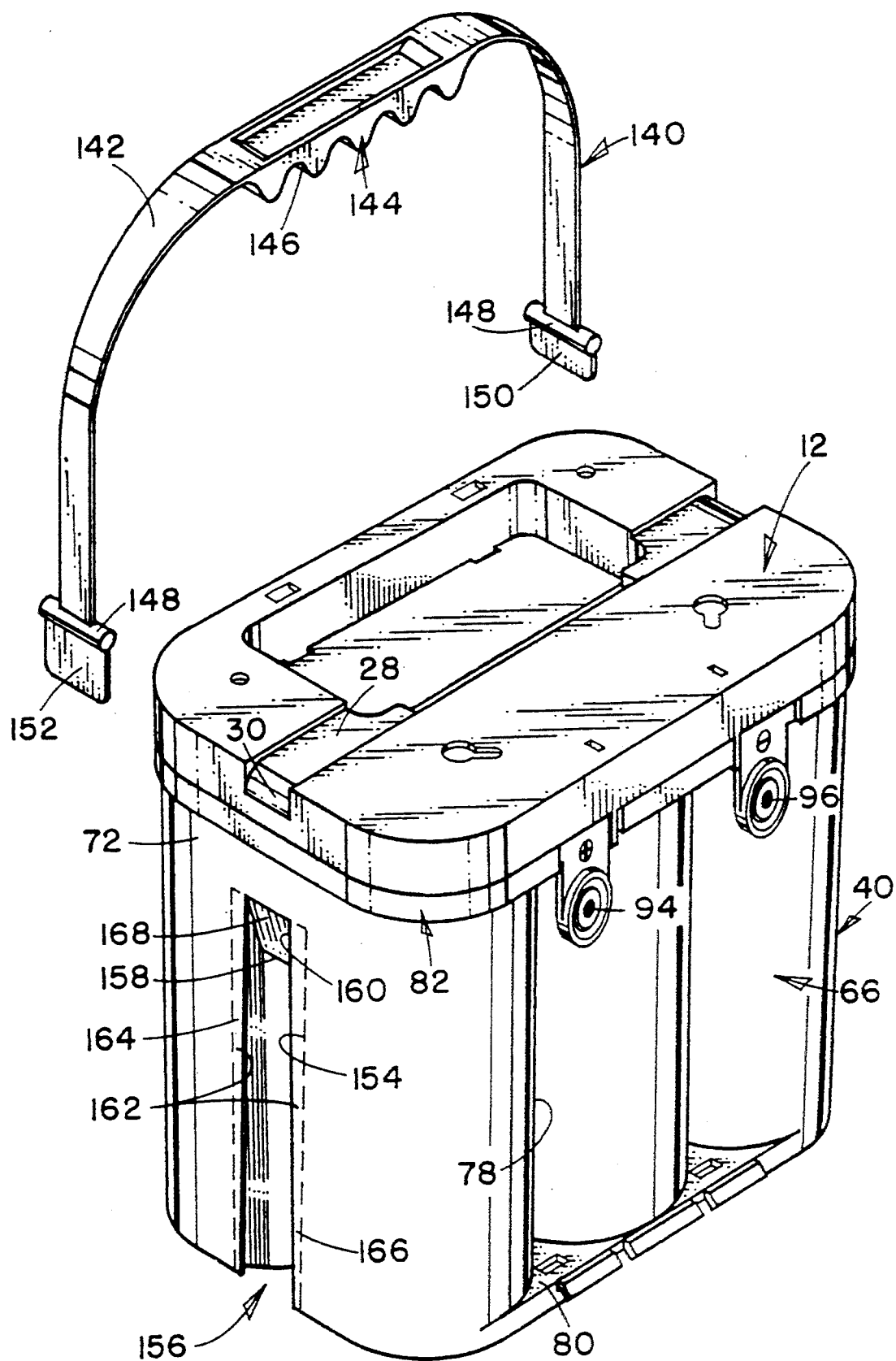
FIG. 9 is a front perspective view of the battery illustrated in FIG. 6 with a handle assembly positioned for attachment thereto.
Figure 10:
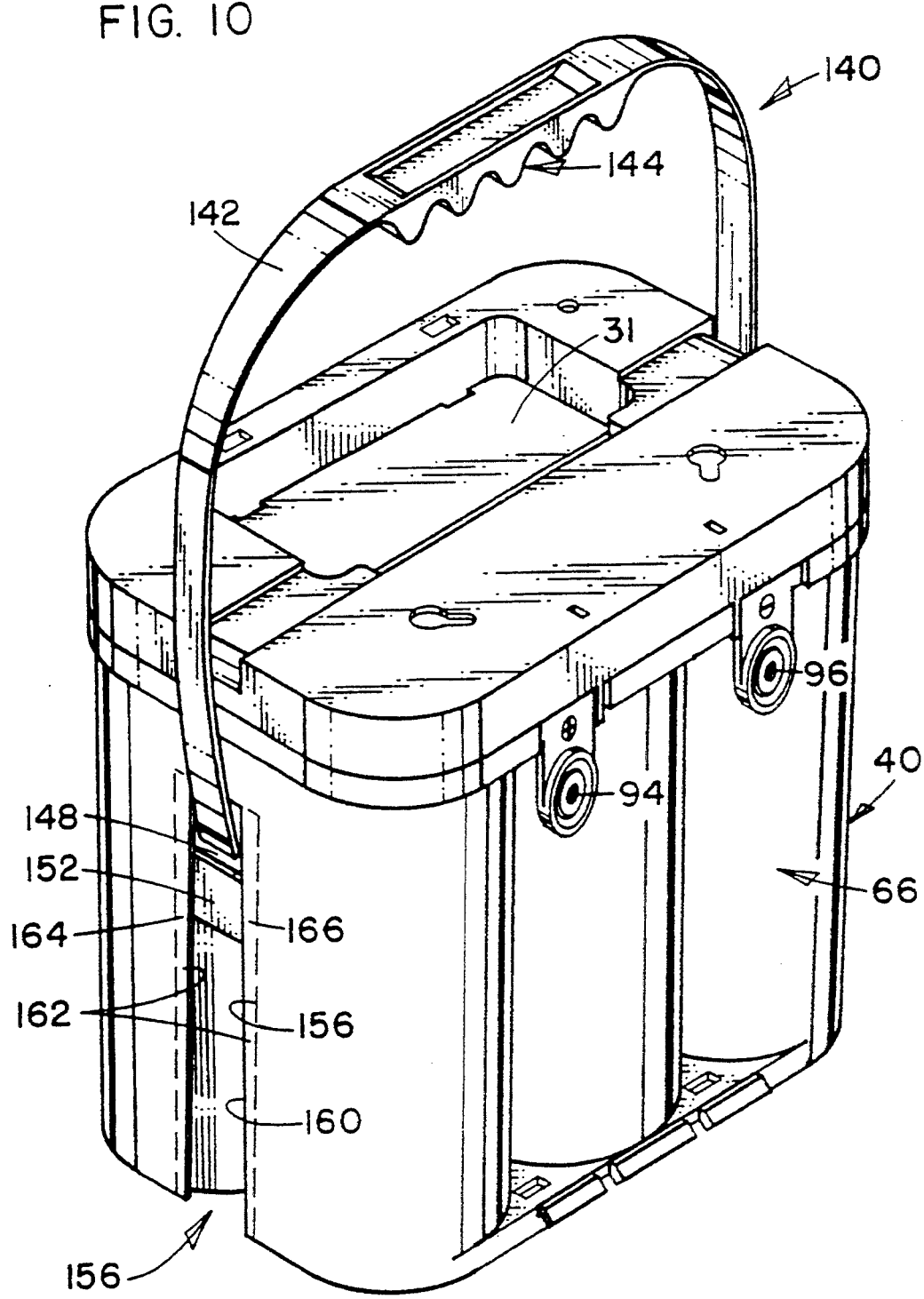
FIG. 10 is a front perspective view similar to that of FIG. 9 but illustrating the handle assembly in a fully assembled position for carrying.

Referring now in particular to FIGS. 9–11, a handle or carrying assembly 140 is provided and is preferably in the form of a strap 142 that is shaped in the form of a "U". The strap 142 is preferably constructed from any known material which has some flexibility yet has the resiliency to snap back to its U-shaped form. In preferred form, the strap 142 is manufactured from a PVC type flexible plastic material. In a preferred form, a hand grip 144 having finger notches 146 therein may be provided to assist in carrying the battery assembly 40. The strap 142 terminates at each end thereof in a stop member or bar 148 which is aligned transversely relative to the length of the strap 142. Projecting downwardly from each stop member 148 is a flange 150 at one end of the strap 142 and a somewhat longer, larger flange member 152 at the opposite end of the strap member 142.

Each end portion 72, 74 of the battery housing 66 includes an end channel 154 that extends from the bottom of the housing 66 toward the top portion of the housing 66. The bottom plate 80 of the housing 66 has an opening 156 that permits the channel 154 to be open at the bottom thereof. The channel 154 terminates at its uppermost end against a shoulder 158 which is spaced from the lid 82. The channel 154 overlaps the nip area 78 (see FIG. 8) in the end 72 equidistantly. An elongated opening 160 is provided in the end portions 72, 74 of the housing 66 along the longitudinal axis of the channel 154, the opening 160 being preferably flared outwardly toward the open end 156 yet narrower than the channel 154. In this manner, a grooved slot 162 is defined in the channel 154 as a result of overlapping side members 164, 166. The opening 160 terminates along a point closer to lid 82 as compared to the shoulder 158. The area 168 between the end of the opening 160 and the shoulder 158 is preferably in the form of a slanted or sloped member aligned with the recess 28 and the recessed end portion 30 in cover 12 so as to cooperate with each other relative to the handle 140 as described below.

During normal use of the battery assembly 40, and referring particularly to FIG. 10, the handle assembly 140 is positioned and connected to the housing 66 so that the flanges 150 and 152 are disposed within the grooved slot 162 as in a tongue-in-groove arrangement, with the stop members 148 being abutted against the shoulder 158. Thus, when the battery 40 is carried by the handle grip 144, the stop members 148 abut the shoulders 158 and provide firm attachment for the handle assembly 140 to the battery housing 40. When it is desired to stack batteries 40 one atop the other, the handle grip 144 is pressed downwardly toward the cover 12 so as to slide the flanges 150 and 152 along the channel 154 to the extent wherein the handle grip 144 is then positioned within the opening 31 with the strap 142 being nested in the recessed portion 28 and end portions 30. In this manner, the entire handle assembly 140 may be nested down into the cover 12 and be substantially flush with the surface 14 of the cover member 12 to permit stacking of the battery assemblies 40 one atop the other without damaging the handle assembly 140 or causing the stack of batteries to be unstable.

When it is desired to place the battery assembly 40 in operating position, the handle assembly 140 may be entirely removed and discarded. This is performed by placing the end flange 150 with its stop 148 at the very uppermost portion of the channel 154 in the side portion 74 of the housing 66, and then extending the end flange 152 with its stop 148 downwardly along its channel 154 so as to clear the end stop 148 beyond the opening 156 and remove the flange 152 and end stop 148 from the channel 154 as illustrated in FIG. 11. Once the flange 152 and end stop 148 is removed, the remaining flange 150 with its end stop 148 may likewise be removed from its channel 154 in housing end portion 74 so as to totally disengage the handle assembly 140. In this manner, a handle assembly is provided which does not interfere with the stacking of the batteries and yet is readily available for transportation of the battery. Moreover, the handle assembly may be totally removed in easy fashion for operation of the battery and may be reused or discarded. In this manner, a battery hold down in actual battery applications or with other batteries during shipping and storage can rest firmly on the cover 12 of the battery 40 without damage to or interference by the handle assembly 140.

As can be seen from the above, a combination cover and mounting spacer member for use with multi-cell rechargeable batteries is provided. This particular cover functions to protect the battery terminal posts from damage during shipping and stacking of the battery as well as to protect the battery from electrical shorting when side terminal posts are utilized during certain battery applications. Moreover, the side terminal posts are arranged so as to not interfere with shipping and stacking during storage and transportation. The cover/spacer combination member may also be utilized as a spacer either on top of the battery or beneath the battery for storage or application use. Finally, a handle assembly is provided which may be nested for transportation and storage purposes and may be entirely removed for certain battery applications if desired, yet provides firm gripping and handling of the battery during transportation and carrying thereof. As a result, the combination spacer/cover assembly of the present invention provides multiple uses to both protect rechargeable batteries during transportation and storage as well as to provide protection or spacing appropriate during battery usage in a manner unknown to the prior art. Moreover, this may be done with a single device which is inexpensive to manufacture and is readily adaptable for any type or shape of rechargeable battery.

The foregoing description and the illustrative embodiments of the present invention have been shown in the drawings and described in detail in varying modifications and alternate embodiments. It should be understood, however, that the foregoing description of the invention is exemplary only, and that the scope of the invention is to be limited only to the claims as interpreted in view of the prior art.

The embodiments for which an exclusive property or privilege is claimed are defined as follows:

1. A handle mechanism for a battery casing having a top cover, a bottom portion, oppositely disposed sidewall portions, and oppositely disposed end wall portions, said handle mechanism comprising an elongated flexible strap member connected at each end to said battery end wall portions and extending over said cover, said strap member ends each including an end piece transversely enlarged relative to the longitudinal axis of said strap and being adapted for separate and independent vertical movement along said battery end wall portions to permit strap member movement between a stored position substantially flush with said cover and a carrying position extending over said cover, each said battery end wall portion including an elongated vertical channel having a grooved slot defined along the vertical edges thereof for engagement with the transversely enlarged end piece of one end of said strap for sliding vertical movement within said channel.

2. The handle mechanism as claimed in claim 1, wherein the bottom end portion of each said channel adjacent said battery casing bottom portion is open to permit removal of said strap end piece therethrough, and wherein said strap member is of sufficient length such that one end piece of said strap member is disengagable from the open bottom end of its respective channel while the opposite end piece is lodged at the upper end of its respective channel proximate said battery casing cover.

3. The handle mechanism as claimed in claim 2, wherein each said vertical channel includes a vertical opening therein to define said slot in each said channel, each said opening being tapered from its bottom to its top proximate said battery top cover to permit ease of removal of said strap end piece at the open bottom portion of said channel as well as to secure the interface of said end piece at the top of said channel when said strap is its carrying position.

4. A handle mechanism for a battery case having a top, a bottom, a pair of oppositely disposed sidewalls, and a pair of oppositely disposed end walls, said handle mechanism comprising a flexible strap member having an elongated flexible strap portion, a handle portion disposed along said strap portion, and two opposite end portions, each said end portion including an end member transversely enlarged relative to the width of said strap portion, each end wall of said case including means for engaging one said transversely enlarged end member for sliding vertical movement along said end wall to enable strap member movement between a stored position substantially flush with said top and a carrying position extending over said top.

5. The handle mechanism as claimed in claim 4, wherein said end member engagement means includes means for disconnecting said transversely enlarged end member from one said end wall proximate said case bottom when the opposite transversely enlarged end member is engaged with said opposite end wall and positioned toward said case top, thereby permitting disengagement of said strap from said case.

6. The handle mechanism as claimed in claim 5, wherein said end member engagement means comprises a channel disposed along said end wall and a pair of flanges overlapping said channel to define a vertical opening along said channel and a grooved slot along each vertical edge of said channel, said transversely enlarged end member engaging said slots for vertical movement along said channel.

7. The handle mechanism as claimed in claim 6, wherein said flanges are sized and shaped to taper said vertical opening from said case bottom toward said case top.

8. In a battery case having a top cover, a bottom, a pair of opposed sidewalls, a pair of opposed end walls, and a handle extending over the top cover and connected to said end walls, the improvement wherein said handle comprises a flexible strap member having its end portions secured to said end walls for independent sliding vertical movement therealong, each said strap end portion including a transversely enlarged end member adapted for engagement with and vertical movement along said battery case end wall.

9. The improvement of claim 8, wherein said battery case end walls each include a channel having grooved slots along the vertical edge portions thereof for engaging and securing said transversely enlarged end member to said case end wall for vertical sliding movement therealong.

10. The improvement of claim 9, wherein each said channel is open proximate said battery case bottom to enable selective engagement and disengagement of said transversely enlarged strap end member with said channel.

11. The improvement of claim 9, wherein said flexible strap member is selectively removable from said case.

12. The improvement of claim 9, wherein the upper ends of each said channel proximate said case cover includes a wedge member adapted to engage said transversely enlarged end member when said battery case is carried by said handle.

* * * * *